United States Patent
Novoselsky et al.

(10) Patent No.: US 8,041,948 B2
(45) Date of Patent: Oct. 18, 2011

(54) APPLICATION LEVEL GATEWAY FOR REQUEST VERIFICATION

(75) Inventors: Alexander Novoselsky, Tel-Aviv (IL); Dmitry Rubinstein, Tel-Aviv (IL); Igor Genshaft, Givat-Shmuel (IL)

(73) Assignee: Comverse, Ltd., Tel Aviv (IL)

( * ) Notice: Subject to any disclaimer, the term of this patent is extended or adjusted under 35 U.S.C. 154(b) by 1188 days.

(21) Appl. No.: 10/227,361

(22) Filed: Aug. 26, 2002

(65) Prior Publication Data
US 2004/0039703 A1   Feb. 26, 2004

(51) Int. Cl.
*G06F 17/00* (2006.01)
*H04L 9/00* (2006.01)

(52) U.S. Cl. .......................................... 713/168; 705/50
(58) Field of Classification Search .................. 713/168; 705/50

See application file for complete search history.

(56) References Cited

U.S. PATENT DOCUMENTS

| | | | | |
|---|---|---|---|---|
| 5,812,671 A * | 9/1998 | Ross, Jr. | | 713/153 |
| 6,311,278 B1 * | 10/2001 | Raanan et al. | | 726/14 |
| 6,324,648 B1 * | 11/2001 | Grantges, Jr. | | 726/12 |
| 6,711,678 B2 * | 3/2004 | Ferguson | | 713/153 |
| 6,801,998 B1 * | 10/2004 | Hanna et al. | | 713/155 |
| 7,222,228 B1 * | 5/2007 | Stephens, Jr. et al. | | 713/1 |

* cited by examiner

*Primary Examiner* — Kambiz Zand
*Assistant Examiner* — Aubrey H Wyszynski
(74) *Attorney, Agent, or Firm* — Ohlandt, Greeley, Ruggiero & Perle, LLP

(57) ABSTRACT

A system and method for request verification in an Application Level Gateway (ALG) located between a client and a server in a data transmission network. The ALG receives from a server a message that requires some responsive actions from a client. The ALG adds to this message Verification Data (VD) that includes information about expected actions required from the client. The ALG then sends the message with the above-mentioned additions to the client. The client receives this message and sends a response, with the actual actions and with the VD, to the server. The ALG obtains this response with the VD, and compares the description of the expected actions with actual actions of the client. If the actions of the client are legitimate, the ALG sends the client response to the server.

25 Claims, 2 Drawing Sheets

| No. | Action | Source of Action |
|---|---|---|
| 1 | Sending a message that needs some action(s) from a client in response. | Server |
| 2 | Receiving the message. | ALG |
| 3 | Adding to this message the Verification Data (VD), which includes: unique identifier, encrypted information about actions required from the client, and encrypted data indicating the arrival time of the server message at the ALG. | ALG |
| 4 | Unique identifier and ciphering key are stored in a database. | ALG |
| 5 | Sending the changed message to client. | ALG |
| 6 | Receiving of message. | Client |
| 7 | Performing of client actions. | Client |
| 8 | Sending the response (client actions) with VD. | Client |
| 9 | Receiving the response with actions and with VD. | ALG |
| 10 | Taking the ciphering key from the database. | ALG |
| 11 | Decrypting the information about the expected client actions and the arrival time of the server message at the ALG, by the ciphering key. | ALG |
| 12 | Calculating the difference between the present time and arrival time of the server message at the ALG | ALG |
| 13 | Decision: does said difference exceed the predefined value? If yes, client response is not sent to server. | ALG |
| 14 | Comparing the decrypted description of actions with actual actions of client. | ALG |
| 15 | Decision: are the actions of the client correct? | ALG |
| 16 | If actions of client are correct, sending the client response to the server. | ALG |
| 17 | If the actions of the client are not correct, the client response is not sent to server. | ALG |

| No. | Action | Source of Action |
|---|---|---|
| 1 | Sending a message that needs some action(s) from a client in response. | Server |
| 2 | Receiving the message. | ALG |
| 3 | Adding to this message the Verification Data (VD), which includes: unique identifier, encrypted information about actions required from the client, and encrypted data indicating the arrival time of the server message at the ALG. | ALG |
| 4 | Unique identifier and ciphering key are stored in a database. | ALG |
| 5 | Sending the changed message to client. | ALG |
| 6 | Receiving of message. | Client |
| 7 | Performing of client actions. | Client |
| 8 | Sending the response (client actions) with VD. | Client |
| 9 | Receiving the response with actions and with VD. | ALG |
| 10 | Taking the ciphering key from the database. | ALG |
| 11 | Decrypting the information about the expected client actions and the arrival time of the server message at the ALG, by the ciphering key. | ALG |
| 12 | Calculating the difference between the present time and arrival time of the server message at the ALG | ALG |
| 13 | Decision: does said difference exceed the predefined value? If yes, client response is not sent to server. | ALG |
| 14 | Comparing the decrypted description of actions with actual actions of client. | ALG |
| 15 | Decision: are the actions of the client correct? | ALG |
| 16 | If actions of client are correct, sending the client response to the server. | ALG |
| 17 | If the actions of the client are not correct, the client response is not sent to server. | ALG |

FIG. 2

APPLICATION LEVEL GATEWAY FOR REQUEST VERIFICATION

FIELD AND BACKGROUND OF THE INVENTION

1. Field of the Invention

The present invention relates generally to network communications, and in particular, to a system and method for server protection against network attacks from malicious clients.

2. Description of the Related Art

One of the major obstacles to Internet usage for business purposes is the targeting of web servers by malicious clients. Such clients are able to compromise the server by making unauthorized requests to servers via a network such as the Internet. Such requests may compromise site security and site operation efficiency.

In the case of unauthorized client requests or responses to a server, the server should preferably be enabled to identify and reject these requests. However, many security holes and weaknesses in typical server architectures, protocols and applications prevent the effective processing of these malicious requests.

One of the popular safeguards for preventing network attacks is a firewall. Firewalls are an important part of typical modern communication networks, in that they protect the resources of inner networks during communications with systems located in external networks. Firewalls can defend the inner network from many types of attacks.

An Application Level Gateway (ALG) represents a specific kind of firewall. An ALG operates at the application layer to process traffic through the firewall and can review not only the message traffic, but also message content.

One typical server attack occurs as follows: the server sends to a client, by HTTP protocol, an HTML page with fields for input, such as checkboxes, radio buttons etc. A malicious client will respond to the server with alternative information (e.g. sending an option that was not listed as one of the acceptable choices in the radio button, or by modifying a hidden field value). This information can disrupt normal server operation.

Few defense methods are known to deal with the above type of attack. One such method is described in U.S. Pat. No. 6,311,278, which is fully incorporated herein by reference. According to the '278 patent, the gateway (filter module) is positioned between the server and client. The gateway parses the server messages to identify commands, fields etc. The resulting data represents the set of allowable or authorized user actions and is stored in a protocol database.

When the gateway receives a request from the client, it queries the protocol database to determine whether the client request is permitted. The gateway eliminates any prohibited actions requested by the client to the server (i.e., actions not stored in the protocol database), and allows the remaining, allowable request to the server.

However, information in such a protocol database is not linked to definite HTML pages that are sent from a server to a client. Moreover, a client response allowed for one HTML page may be prohibited for another HTML page. For example, in the case where there are 10 allowable choices for radio button on a first HTML page, there may only 5 choices on a second, similar HTML page. In addition, the 5 choices for radio button on the second HTML page may be the same as 5 of the 10 allowable choices on a first page. Since these pages are similar in content, such a protocol database may not detect the difference in allowable choices, leading to incorrect verification of client responses to such pages. It is clear that this method poses limitations.

Furthermore, querying a large database can consume much time and many resources of a computer system, causing increased delays in communication between the server and client. Accordingly, the solution proposed in the '278 patent is not totally satisfactory.

Patent Application No. 01/31415 of WIPO (incorporated herein by reference) describes a method and system for verifying a client request. The method includes receiving a message including a set of actions or a program from a server, and simulating the execution of this client-side logic. As a result of this simulation, a list of allowable actions and allowable user input is defined. This list is then compared with the list of actual client actions and inputs. Only those actual client actions and inputs that are found on the list are considered to be authorized client requests, and are passed to the server.

The solution proposed by this method and system requires simulating the execution of client-side logic. This simulation produces processing delays and consumes considerable computer resources. Accordingly, the solution proposed in Patent Application 01/31415 is also not totally satisfactory.

There is thus a recognized need for, and it would be highly advantageous to have, an Application Level Gateway (ALG) that can accurately validate client responses to a server on a per message basis, and that does not require a costly simulation procedure.

SUMMARY OF THE INVENTION

To solve the problems described above, the present invention provides a system and method for efficient request verification by an ALG. Such verification is achieved for client responses to server requests, on a per message basis.

The basic method for such request verification is as follows:

i. Setting up an ALG so as to receive all server messages before they reach the client and in addition to receive all client responses before they reach a server;

ii. The ALG intercepts all server messages. If a server message requires any action(s) from the client, the ALG adds to the server message Verification Data (VD). The VD includes a unique identifier; encrypted information about the expected actions required from a client, in response to the server message; and encrypted data indicating the arrival time of the server message at the ALG;

iii. Storing the unique identifier together with a ciphering key for the encrypted information in the ALG;

iv. Sending the server message with the added VD to the client;

v. The client receives this message and sends a response with performed action(s) together with the VD, to the ALG;

vi. The ALG obtains this client response with the VD, extracts the unique identifier from the response, finds in its database a ciphering key by the unique identifier, and decrypts the VD using the ciphering key;

vii. The ALG compares the decrypted description of the expected action(s) with the actual action(s) executed by the client.

If the action(s) of the client are correct and correspond to the request of the server, and in addition, the difference between the present time and the time in the VD does not exceed a predefined value, then the ALG sends the client response to the server;

viii. If the action(s) of the client are not correct, i.e. do not correspond to the server request, or the difference between the present time and the time in the VD exceeds a predefined value, then the ALG does not send the client response to the server.

An alternative embodiment of the present invention provides a system and method wherein hashing is used to verify the message integrity.

A further embodiment of the present invention provides a system and method wherein compression is used for decreasing the amount of information that is added to server messages.

The advantages of the present invention over the known Prior Art include:
1. The actual allowable message content is defined on a per message basis.
2. The verification data that is added to a message has a small volume. In addition, the simple and fast verification procedure, as well as a low utilization of system resources, decreases the response time for message queries.

BRIEF DESCRIPTION OF THE DRAWINGS

The principles and operation of a system and a method according to the present invention may be better understood with reference to the drawings and the accompanying description, it being understood that these drawings are given for illustrative purposes only and are not meant to be limiting, wherein:

FIG. 2 is a table illustrating a sample scenario of the ALG operation, according to the present invention.

DESCRIPTION OF THE PREFERRED EMBODIMENTS

Figure 1:
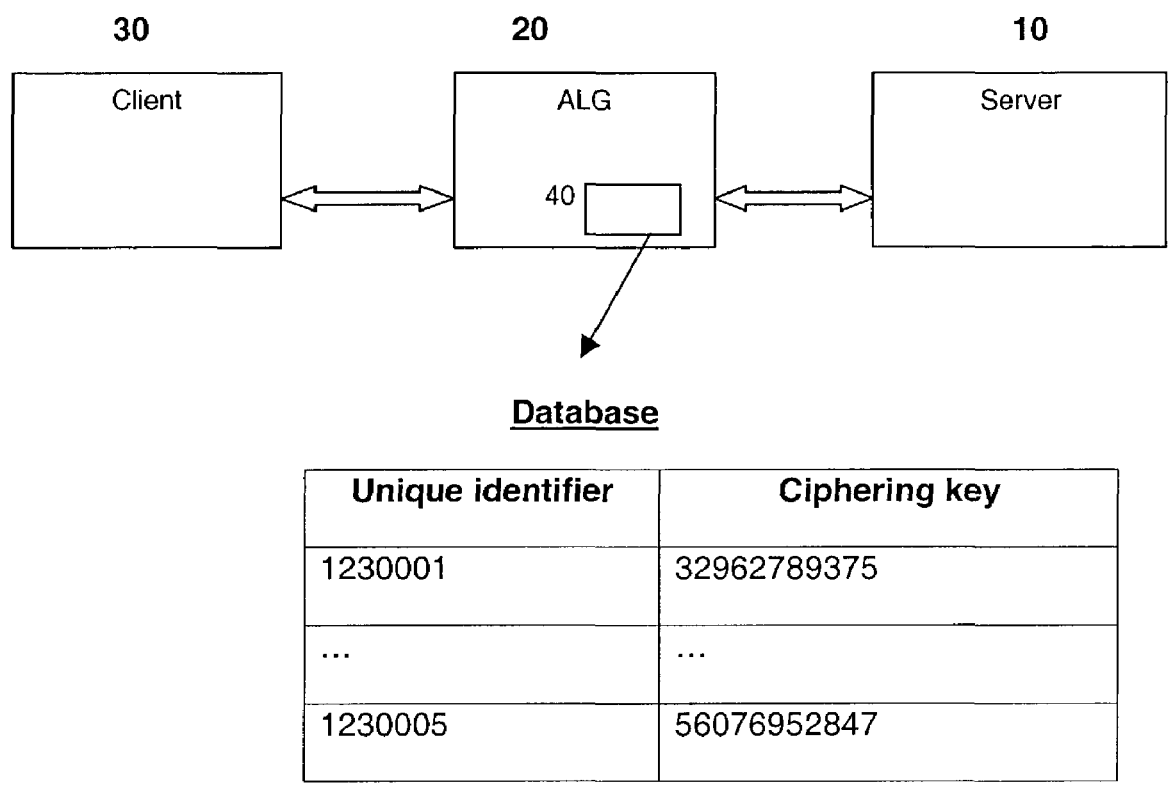
FIG. 1 is a block diagram of a sample network with a client, an ALG and a server.

The present invention relates to a system and method for providing an Application Level Gateway (ALG) with the capability of request verification in a data transmission network. Such verification, according to a preferred embodiment of the present invention, is achieved for client responses to server requests, on a per message basis.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the ALG, according to a preferred embodiment of the present invention, is placed between the server and client, and it manages all messages communicated therebetween. The ALG can be stored and maintained on the server or on computer(s) connected to the server.

Accordingly, the server sends to the ALG messages that require some responsive actions from a client, such as messages that include input fields, choices of options etc. The ALG subsequently sends the server message to a client, but it first appends Verification Data (VD) to the message. The ALG thereafter receives and analyzes the client response in order to verify that the client response to the server message is legitimate and safe before transferring the client response to the server.

As can be seen in FIG. 1, the ALG 20 is placed between the server 10 and client 30, and it manages messages communicated therebetween. When the server 10 sends to the client 30 a message that requires some responsive actions from a client, the message will include, for example, various input fields or choices of options. The ALG 20 adds to this message Verification Data (VD), which includes a unique identifier, encrypted information about possible or expected actions from the client 30 and encrypted data indicating the arrival time of the server message at the ALG 20.

This VD is later used to verify that the actual actions from a client 30 are in accordance with the expected actions and, in addition, that the difference between the present time and the time in the VD does not exceed a predefined value, thereby verifying client responses. If HTTP protocol is used in the data transmission network, the VD can be added as hidden unchanged fields in an HTML page.

The expected actions of client 30 are derived by a parsing procedure, commonly known in the art (see, for example, Philip M. Lewis 2nd, Daniel J. Rosenkrantz, Richard E. Stearns, "Compiler Design Theory". Addison-Wesley, 1976, incorporated herein by reference), whereby the possible or expected actions in a server request are identified. According to an embodiment of the present invention, description of these expected actions is subsequently encrypted and added to the server message, thereby accompanying the server message sent to the client 30 and the actual client response to the server message so that a comparison can be performed between the expected and actual responses.

When the ALG 20 receives a server message, the ALG generates a unique identifier (for identifying the message) and a corresponding ciphering key (for encoding and decoding the VD), and then stores this information in a database 40. Symmetric (secret-key) ciphering with a key that is valid for one occasion only (one-time pad) can be used in order to enhance security of the system.

As is known in the art, the generation of keys can be made by a physical device, such as a noise-making diode, by using a software tool or any other method known in the art (see Eastlake, D., Crocker, S., Schiller, J. "Randomness Recommendations for Security", RFC 1750, December 1994).

An administration and a Graphic User Interface (GUI) can be used by an administrator for the control, configuration and customization of the ALG. Reporting on ALG actions (rejected and passed client requests etc.) can be provided for possible follow-up, audit, analysis etc. by software tools or by the ALG itself. The ALG can employ common formats for the report files, such as e.g. Common Log Format (CLF), Extended Common Log Format (ECLF) etc.

The Process

The following process is executed according to an embodiment of the present invention, as can be seen in FIG. 2:

1. A server 10 sends a message to a client 30, such that the message requires some client action(s) in response. For example, the client 30 is required to add certain input into one or more input fields, or to choose options on an online form.

2. This message is received by the ALG 20, which is positioned between the server 10 and client 30.

3. The ALG 20 parses out, from the server message, possible or expected actions by the client 30, and encrypts information representing the parsed possible or expected actions. The ALG 20 then adds, to the server message, Verification Data (VD) that includes a unique identifier (for identifying the server message), the encrypted information representing possible or expected actions by the client and encrypted data indicating the arrival time of the server message at the ALG 20. The possible or expected actions of client 30 may be derived by the parsing operation described, for example, in U.S. Pat. No. 6,311,278. For example, the parser breaks down statements contained in the relevant server messages, finds the statements related to user actions, and converts them into units that can be queried. These units represent, on a per-message basis, user actions that are deemed allowable. All other user actions subsequently provided by client requests that are not defined as allowable by the original parsing procedure, are considered prohibited or malicious.

4. The unique identifier of the server message and ciphering key for deciphering the relevant VD of that server message are stored in a database 40 in the ALG 20 (FIG. 1).

In addition to the above method, hashing can be used in this step, before or after ciphering for verifying the message integrity.

Hashing is the procedure, well known in the art (see Rivest R., "The MD5 Message-Digest Algorithm", RFC 1321, April 1992), whereby the source data is transformed into a substantially smaller amount of data (hash value), such that some other data will not produce the same hash value. The result of the hashing procedure is added to the server message as part of the VD, together with the actual data.

Since hashing, according to the present invention, is not used to create a short index into a database, possible hashing collisions do not provide a problem.

In addition, or alternatively, compression can be used before encryption, for decreasing the quantity of VD that is added to the server message. Compression (archiving) is a procedure, well known in the art (see, for example, American National Standards Institute, Inc., "Data Compression Method for Information Systems," ANSI X3.241-1994, August 1994), for decreasing the amount of data, by such a method that enables subsequent decompression.

5. The ALG 20 subsequently sends the message, with the VD, to the client 30.

6. The client 30 receives the message.

7. The client 30 responds to the message by, for example, filling in a form requested in the server message.

8. The client 30 sends the response (actual executed actions) and the original VD to the server 10.

9. The ALG 20 intercepts the client response.

10. The ALG 20 finds the ciphering key in the database 40, according to the unique identifier in the server message VD. That is, the unique identifier acts as an address in the database 40 for the appropriate ciphering key.

11. The ALG 20 uses the ciphering key to decrypt the received VD information about expected actions and the arrival time of the server message at the ALG 20. Such a key is optionally valid for only one occasion.

12. The ALG 20 calculates the difference between the present time and the arrival time of the server message at the ALG 20 and determines whether the difference exceeds a predefined value. If this predefined value is exceeded, the client response to the server message is considered stale, and therefore it is not sent to the server 10.

The time element is used as an additional defense against hacker attacks, by disallowing client responses that took unnaturally long to be sent. Hacker attacks often include tampering with client responses, in which case it may take the client response a relatively long time to arrive at the server. It is therefore important to be able to detect possible hacker responses by relating to the client response time.

13. The ALG 20 also compares the decrypted information representing possible or expected client actions (determined before the server message was sent to the client) with the actual actions of the client 30. For example, the list of allowable choices can include statements extracted from the server message, by the parser. This list contained in the server message is subsequently compared with the actual choices or responses made by the client.

14. The ALG 20 decides, based on this comparison, if the actions of the client 30 were legitimate and/or correct. This decision can be based on exact matches of responses or by a determined level of similarity. For example, the ALG administrator may determine that only words that are exactly matched to allowable requests be allowed, or that words with similar forms be allowed. Alternatively, allowable requests must be from a predefined list of allowable choices that was included in VD data. Alternatively, allowable requests must correspond to predefined lists of allowable rules, such as specifying that inputted text must contain only letters, but not digits, and such rules can be stored in the ALG.

15. If the actions of the client 30 are determined to be legitimate, the ALG 20 sends the client response to the server 10.

16. If the actions of the client 30 are determined to be illegitimate or malicious, then the ALG 20 does not send the client response to the server 10, and instead may create, for example, a report about such illegitimate or malicious actions.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A method for enabling an Application Level Gateway (ALG) to verify client responses to server messages on a per message basis, in a data transmission network, comprising:
   i. receiving from a server a message;
   ii. adding Verification Data (VD) to said server message, said VD including encrypted information representing at least one expected client action in response to the server message;
   iii. storing information in the ALG for decrypting the included encrypted information;
   iv. sending said server message with said included encrypted information to said client;
   v. receiving from said client a response including said included encrypted information;
   vi. decrypting said included encrypted information using said stored information;
   vii sending said client response to said server only if said client response matches an expected client response from said decrypted VD information.

2. The method of claim 1, wherein the stored information represents a unique identifier for identifying the server message and a ciphering key for decrypting the included encrypted information.

3. The method of claim 1, wherein said VD further includes encrypted information representing the arrival time of the server message at the ALG.

4. The method of claim 3, further comprising, after decrypting said included encrypted information:
   comparing the present time and the arrival time of said server message at the ALG; and
   if a difference between said times exceeds a predefined value, then rejecting said client response to said server.

5. The method of claim 1, wherein said VD further comprises a unique identifier for identifying the server message, and at least one of: encrypted information about expected actions required from said client, and encrypted data indicating the arrival time of said server message at the ALG.

6. The method of claim 1, wherein if the expected client response and said client response do not match, then preparing a report about said rejected client response.

7. The method of claim 1, further comprising performing a hashing operation on said VD, and adding the result of said hashing operation to said server message as part of said VD.

8. The method of claim 7, wherein said VD further comprises a unique identifier for identifying the server message.

9. The method of claim 1, wherein a compression operation is performed on said VD before adding said VD to said server message, for decreasing the quantity of VD in said server message.

10. The method of claim 1, wherein the client response comprises a certain input into one or more input fields or a choosing of an option on an on-line form.

11. A system for enabling an Application Level Gateway (ALG) to verify client responses to server requests, comprising:
   i. a server computer for providing server requests;
   ii. a client computer for providing client responses to said server requests;
   iii. an Application Level Gateway (ALG) configured to verify said client responses such that when said server sends to said client computer at least one server request that requires at least one action from said client in response, the ALG adds to said server request Verification Data (VD) that enables verification of said at least one client response,
   wherein the VD includes encrypted information representing at least one expected client action in response to the server request,
   wherein said client computer receives said server request including the added included encrypted information and adds thereto a client response, and said ALG receives the client response including the included encrypted information from said client computer.

12. The system of claim 11, wherein said VD comprises a unique identifier for identifying the server message, and at least one of: encrypted information about expected actions required from said client and encrypted data indicating the arrival time of said server message at the ALG.

13. The system of claim 12, wherein the included encrypted information is encrypted by said ALG before being sent to said client computer.

14. The system of claim 13, wherein a ciphering key for decrypting the included encrypted information is stored in the ALG along with the unique identifier, added to the server request for identifying the server request.

15. The system of claim 14, wherein the ALG decrypts the included encrypted information using the information stored in the ALG and compares the decrypted expected client response with the actual client response, and based on the comparison determines whether to send the actual client response to the server computer.

16. The system of claim 15, wherein the ALG decrypts the included encrypted information using the information stored in the ALG and compares the decrypted arrival time of the server message at the ALG with the present time, and based on the comparison determines whether to send the actual client response to the server computer.

17. The system of claim 14, wherein the ALG decrypts the included encrypted information using the information stored in the ALG and compares the decrypted arrival time of the server message at the ALG with the present time, and based on the comparison determines whether to send the actual client response to the server computer.

18. The system of claim 11, wherein the client response comprises a certain input into one or more input fields or a choosing of an option on an on-line form.

19. A system for validating a response from a client computer, relative to a request from a server computer, the system comprising:
   an Application Level Gateway (ALG) configured to add encrypted information to the server request, the added encrypted information enabling the ALG to subsequently ascertain whether the client computer performed an inappropriate action,
   wherein the said added encrypted information relates to an appropriate response by the client computer, and
   wherein the ALG is further configured to (a) send the request from a server computer together with the added encrypted information to the client computer; (b) receive the response from a client computer with said added, encrypted information and (c) use the added information in the client response to ascertain whether the client computer performed an inappropriate action.

20. The system of claim 19, wherein the added information further includes encrypted information representing a time stamp.

21. The method of claim 19, wherein the client response comprises a certain input into one or more input fields or a choosing of an option on an on-line form.

22. A system for validating a response from a client computer, relative to a request from a server computer, the system comprising:
   an Application Level Gateway (ALG) configured to: (a) add encrypted information, related to an expected response, to the request; (b) send the request and the added encrypted information; (c) receive the response from the client computer including the encrypted information; and (d) use the added information in the response to ascertain whether the client performed an inappropriate action,
   wherein the added information relates to an appropriate action by the client computer.

23. The system of claim 22, wherein the added information further includes encrypted information representing a time stamp.

24. The system of claim 23, wherein the time stamp represents the arrival time of the server request at the ALG, and wherein the ALG is further configured to compare after receiving a response from a client computer the time stamp from said added information with the present time, and based on the comparison determines whether to send the response to the server computer.

25. The method of claim 22, wherein the response from the client comprises a certain input into one or more input fields or a choosing of an option on an on-line form.

* * * * *